(12) United States Patent
Zhu et al.

(10) Patent No.: US 12,141,882 B2
(45) Date of Patent: Nov. 12, 2024

(54) METHODS, SYSTEMS, AND MEDIA FOR RIGHTS MANAGEMENT OF EMBEDDED SOUND RECORDINGS USING COMPOSITION CLUSTERING

(71) Applicant: Google LLC, Mountain View, CA (US)

(72) Inventors: Kevin Song Zhu, Mountain View, CA (US); Thomas Bugnon, Zurich (CH); Keith Wedelich, Mountain View, CA (US); George Huang, Mountain View, CA (US); Jacob Levine, Mountain View, CA (US); Sha Chang, Mountain View, CA (US); Julian Bill, Mountain View, CA (US); Arthur Gaudriot, Queenstown (SG); Nicholas Bryan Johnson, Mountain View, CA (US); Vishaal Prasad, Mountain View, CA (US)

(73) Assignee: Google LLC, Mountain View, CA (US)

( * ) Notice: Subject to any disclaimer, the term of this patent is extended or adjusted under 35 U.S.C. 154(b) by 257 days.

(21) Appl. No.: 17/778,142

(22) PCT Filed: Dec. 11, 2019

(86) PCT No.: PCT/US2019/065664
§ 371 (c)(1),
(2) Date: May 19, 2022

(87) PCT Pub. No.: WO2021/101577
PCT Pub. Date: May 27, 2021

(65) Prior Publication Data
US 2022/0414808 A1  Dec. 29, 2022

Related U.S. Application Data

(60) Provisional application No. 62/937,751, filed on Nov. 19, 2019.

(51) Int. Cl.
*G06Q 20/06* (2012.01)
*G06Q 20/12* (2012.01)
(Continued)

(52) U.S. Cl.
CPC ....... *G06Q 50/184* (2013.01); *G06Q 20/1235* (2013.01); *G06Q 2220/10* (2013.01)

(58) Field of Classification Search
CPC ... G06Q 50/00–60; G06Q 2220/00–18; G06Q 20/00–425
See application file for complete search history.

(56) References Cited

U.S. PATENT DOCUMENTS 6,990,453 B2 * 1/2006 Wang ...................... G10L 17/26
704/E15.045
9,052,986 B1 * 6/2015 Postelnicu ............ G06F 16/683
(Continued)

OTHER PUBLICATIONS

Damnjanovic et al., "Enriched access to digital audiovisual content", 9th Symposium on Neural Network Applications in Electrical Engineering, IEEE, Sep. 25, 2008, pp. 17-20, URL: https://ieeexplore.ieee.org/abstract/document/4685549.
(Continued)

*Primary Examiner* — Chenyuh Kuo
(74) *Attorney, Agent, or Firm* — Shumaker & Sieffert, P.A.

(57) ABSTRACT

Methods, systems, and media for determining and presenting information related to embedded sound recordings are provided. In some embodiments, the method comprises: receiving a content item; extracting a sound recording from the content item; generating a melody fingerprint of the extracted sound recording; determining whether the melody fingerprint of the extracted sound recording matches one of a plurality of clusters of similar sounding sound recordings in a reference database, wherein each cluster in the plurality of clusters of similar sounding sound recordings is associ-
(Continued)

ated with ownership information based on a plurality of ownership information associated with each of the sound recordings in the cluster; in response to determining that the melody fingerprint of the extracted sound recording matches a cluster of similar sounding sound recordings, retrieving ownership information associated with the cluster; mapping the ownership information to the sound recording extracted from the content item; and causing an action to be performed on the content item based on the mapped ownership information.

12 Claims, 5 Drawing Sheets

(51) Int. Cl.
*G06Q 20/22* (2012.01)
*G06Q 20/36* (2012.01)
*G06Q 20/38* (2012.01)
*G06Q 50/18* (2012.01)

(56) References Cited

U.S. PATENT DOCUMENTS

| | | | |
|---|---|---|---|
| 9,142,000 B2 | 9/2015 | King et al. | |
| 9,436,810 B2 | 9/2016 | Brock et al. | |
| 2007/0220592 A1* | 9/2007 | Muehlbauer | G06F 16/41 |
| | | | 726/4 |
| 2012/0124638 A1* | 5/2012 | King | H04N 21/23418 |
| | | | 726/1 |
| 2012/0323800 A1* | 12/2012 | Stein | G06F 21/10 |
| | | | 705/310 |
| 2013/0243205 A1* | 9/2013 | Wang | G10H 1/361 |
| | | | 381/56 |
| 2017/0132510 A1 | 5/2017 | Paluri et al. | |
| 2017/0195752 A1* | 7/2017 | Harron | H04N 21/23418 |
| 2019/0318060 A1* | 10/2019 | Brenner | H04N 21/8113 |

OTHER PUBLICATIONS

International Preliminary Report on Patentability from International Application No. PCT/US2019/065664 dated May 17, 2022, 8 pp.
International Search Report and Written Opinion of International Application No. PCT/US2019/065664 dated Jul. 14, 2020, 11 pp.

* cited by examiner

100

102

- VIDEO CONTENT -

104

Music in this Video

1. Song Name
   Artist: Artist Name  — 106
   Album: Album Name
   Songwriter: Writer Name
   Publisher: Publisher Name 2. Song Name
   Artist: Artist Name
   Album: Album Name
   Songwriter: Writer Name
   Publisher: Publisher Name

FIG. 1

METHODS, SYSTEMS, AND MEDIA FOR RIGHTS MANAGEMENT OF EMBEDDED SOUND RECORDINGS USING COMPOSITION CLUSTERING

CROSS-REFERENCE TO RELATED APPLICATIONS

This application claims the benefit of U.S. Provisional Patent Application No. 62/937,751, filed Nov. 19, 2019, which is hereby incorporated by reference herein in its entirety.

TECHNICAL FIELD

The disclosed subject matter relates to methods, systems, and media for rights management of embedded sound recordings using composition clustering. More particularly, the disclosed subject matter relates to generating clusters of similar sounding sound recordings and using information from the generated clusters to automatically match statements of ownership to at least a portion of a cluster.

BACKGROUND

Generally, a "sound recording" refers to a particular musical performance stored on a tangible storage medium such as an optical disc (e.g., CD, DVD), magnetic disc or tape, solid state memory (e.g., memory card) or other persistent, tangible storage medium. In the music industry, sound recordings are typically produced and distributed by record labels, that is, by companies that scout, develop, and manage recording artists, and coordinate the marketing, promotion, production, manufacture, and distribution of sound recordings. These record labels typically hold various rights under copyright law to the sound recordings they produce, although other entities may also hold these rights. In some instances, two or more recording labels or other entities may hold ownership rights to a single sound recording as the sound recording ownership may vary by country.

In contrast to a sound recording, a "composition" generally refers to an original piece of music (i.e., a song) that is not limited to one particular sound recording that memorializes a performance of the piece. For example, for a given composition by a songwriter, there may be a studio recording by the songwriter, a recorded live performance, and a recorded cover performance by another artist, each of which would be a distinct sound recording. Ownership rights to a composition are typically held by music publishers who collect royalties and distribute them to the songwriters, although other entities may also hold these rights. For example, in some cases, the music publisher is also the recording label.

Most recording labels directly collect royalties on the use of their sound recordings. By contrast, composers and music publishers typically collect royalties on the use of their compositions through the facilities of a copyright collecting agency (or a "performance rights organization"), such as ASCAP, BMI, and SESAC. For international performances, international collecting societies are typically responsible for collecting royalty payments on behalf of the rights holders. In some instances, two or more publishers or other entities hold ownership rights to a single composition. Furthermore, composition ownership may vary by country.

Media hosting services that allow users to upload media content, such as music content and video content, have become increasingly popular. As the volume of hosted media content continues to grow, the management of ownership rights pertaining to the hosted media content has become an increasingly challenging problem for these content hosting services. For music content embedded in an audio or video file, for example, the songwriter, the publisher, and the recording label are only some of the different entities that may hold rights to the media content. For appropriate payments to be made to copyright holders, media content must be correctly identified. However, unlike television and radio environments where the content is typically identified prior to airing, media hosting services often handle user-provided media content that may initially be unidentified. Manual identification of such media content becomes onerous when media hosting sites receive thousands or millions of new media content uploads every day, and traditional automated mechanisms lack the robustness and scalability required for modern media hosting services. The identification problem becomes even more complex when media uploads include live performances or cover performances that do not precisely match any sound recording known to the media hosting service, their content is not identified in associated metadata, and the information associated with such content is inconsistent and/or conflicting with the information associated with other received media content.

Accordingly, it is desirable to provide new methods, systems, and media for rights management of embedded sound recordings using composition clustering.

SUMMARY

Methods, systems, and media for rights management of embedded sound recordings using composition clustering are provided.

In accordance with some embodiments of the disclosed subject matter, a method for providing information related to embedded sound recordings is provided, the method comprising: receiving a content item; extracting a sound recording from the content item; generating a melody fingerprint of the extracted sound recording; determining whether the melody fingerprint of the extracted sound recording matches one of a plurality of clusters of similar sounding sound recordings in a reference database, wherein each cluster in the plurality of clusters of similar sounding sound recordings is associated with ownership information based on a plurality of ownership information associated with each of the sound recordings in the cluster; in response to determining that the melody fingerprint of the extracted sound recording matches a cluster of similar sounding sound recordings, retrieving ownership information associated with the cluster; mapping the ownership information to the sound recording extracted from the content item; and causing an action to be performed on the content item based on the mapped ownership information.

In some embodiments, the action further comprises causing a user interface to be presented that suggests that the ownership information is associated with the content item.

In some embodiments, the action further comprises transmitting a recommendation to an entity associated with the ownership information regarding an ownership claim to the content item.

In some embodiments, the method further comprises: determining a user-inputted entity in ownership information associated with the content item does not match the ownership information associated with the cluster; and transmitting a notification to the user-inputted entity that an ownership claim to the content item should not be made.

In some embodiments, the method further comprises: determining that additional sound recordings in the cluster of similar sounding sound recordings are not associated with an entity corresponding to the ownership information; and transmitting a recommendation to the entity associated with the ownership information regarding an ownership claim to the additional sound recordings.

In some embodiments, the method further comprises determining whether ownership information associated with each of the sound recordings in the cluster should be associated with the cluster.

In some embodiments, the melody fingerprint represents a melody of a composition embodied in the sound recording extracted from the content item.

In accordance with some embodiments of the disclosed subject matter, a system for providing information related to embedded sound recordings is provided, the system comprising a memory and a hardware processor that, when executing computer-executable instructions stored in the memory, is configured to: receive a content item; extract a sound recording from the content item; generate a melody fingerprint of the extracted sound recording; determine whether the melody fingerprint of the extracted sound recording matches one of a plurality of clusters of similar sounding sound recordings in a reference database, wherein each cluster in the plurality of clusters of similar sounding sound recordings is associated with ownership information based on a plurality of ownership information associated with each of the sound recordings in the cluster; in response to determining that the melody fingerprint of the extracted sound recording matches a cluster of similar sounding sound recordings, retrieve ownership information associated with the cluster; map the ownership information to the sound recording extracted from the content item; and cause an action to be performed on the content item based on the mapped ownership information.

In accordance with some embodiments of the disclosed subject matter, a non-transitory computer-readable medium containing computer-executable instructions that, when executed by a processor, cause the processor to perform a method for providing information related to embedded sound recordings is provided, the method comprising: receiving a content item; extracting a sound recording from the content item; generating a melody fingerprint of the extracted sound recording; determining whether the melody fingerprint of the extracted sound recording matches one of a plurality of clusters of similar sounding sound recordings in a reference database, wherein each cluster in the plurality of clusters of similar sounding sound recordings is associated with ownership information based on a plurality of ownership information associated with each of the sound recordings in the cluster; in response to determining that the melody fingerprint of the extracted sound recording matches a cluster of similar sounding sound recordings, retrieving ownership information associated with the cluster; mapping the ownership information to the sound recording extracted from the content item; and causing an action to be performed on the content item based on the mapped ownership information.

In accordance with some embodiments of the disclosed subject matter, a system for providing information related to embedded sound recordings is provided, the system comprising: means for receiving a content item; means for extracting a sound recording from the content item; means for generating a melody fingerprint of the extracted sound recording; means for determining whether the melody fingerprint of the extracted sound recording matches one of a plurality of clusters of similar sounding sound recordings in a reference database, wherein each cluster in the plurality of clusters of similar sounding sound recordings is associated with ownership information based on a plurality of ownership information associated with each of the sound recordings in the cluster; means for retrieving ownership information associated with the cluster in response to determining that the melody fingerprint of the extracted sound recording matches a cluster of similar sounding sound recordings; means for mapping the ownership information to the sound recording extracted from the content item; and means for causing an action to be performed on the content item based on the mapped ownership information.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 1 shows an illustrative example of a user interface for presenting information about one or more sound recordings embedded in a video in accordance with some embodiments of the disclosed subject matter.

DETAILED DESCRIPTION

Figure 2:
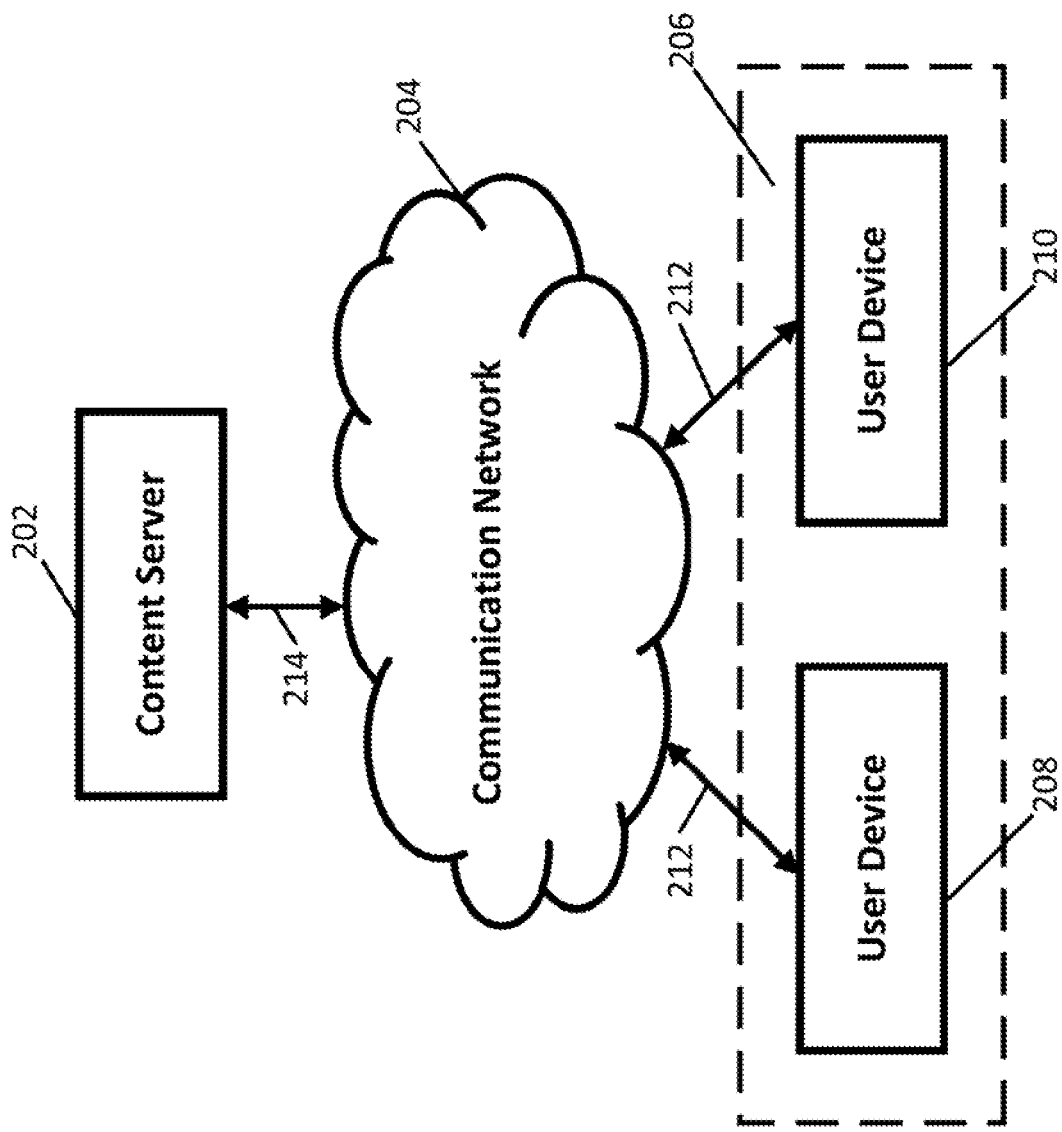
FIG. 2 shows a schematic diagram of an illustrative system suitable for implementation of mechanisms described herein for rights management of embedded sound recordings using composition clustering in accordance with some embodiments of the disclosed subject matter.
Figure 3:
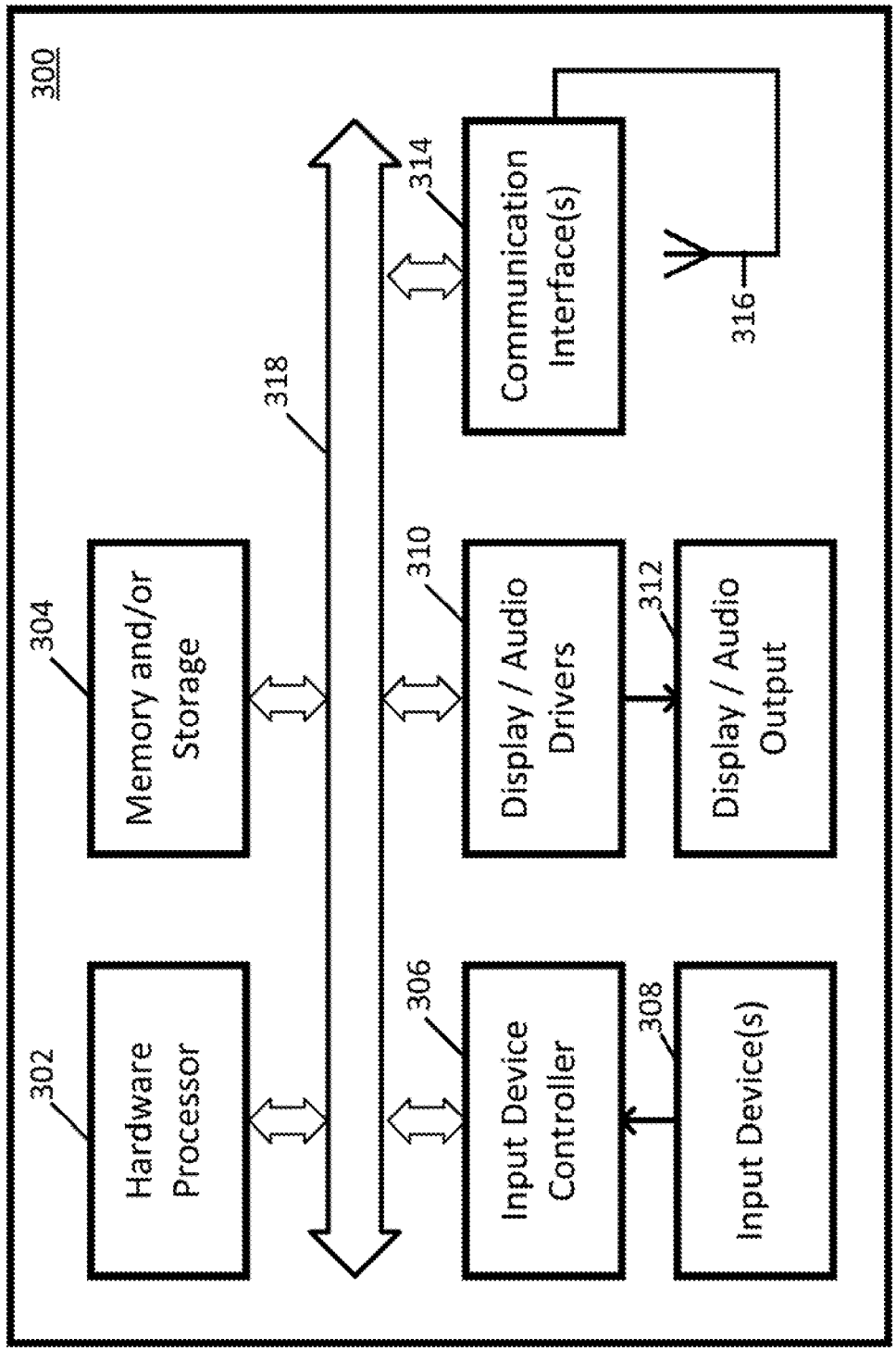
FIG. 3 shows a detailed example of hardware that can be used in a server and/or a user device of FIG. 2 in accordance with some embodiments of the disclosed subject matter.

In accordance with various embodiments, mechanisms (which can include methods, systems, and media) for rights management of embedded sound recordings using composition clustering are provided.

In some embodiments, the mechanisms can include a content recognition system that determines ownership rights associated with a content item uploaded to a media hosting service. In addition to identifying previously known sound recordings, the content recognition system can also beneficially identify compositions (e.g., songs) that are embodied in recorded live performances or cover performances that do not precisely match previously known sound recordings. Once the content recognition system identifies a composition embodied in an uploaded content item, the content recognition system can determine ownership information pertaining to those compositions.

It should be noted that, to identify ownership information pertaining to a composition embodied in an uploaded content item, the mechanisms can generate a melody fingerprint for a sound recording within the uploaded content item. The melody fingerprint can represent a melody of the composition embodied in the sound recording by extracting features that are invariant to changes in the key, instrumentation, artistic interpretation or performance, or recording methods or artifacts. Accordingly, differences in the musical performance, recording, and processing do not substantially affect the melody fingerprint.

In some embodiments, the mechanisms can query a reference database for a composition cluster of similar sounding sound recordings matching the input melody fingerprints. For example, the reference data can store reference melody fingerprints of compositions embodied in a set of reference sound recordings. In another example, the mechanisms can apply a machine learning approach (e.g., a convolutional neural network) to each of the reference melody fingerprints to perform melody matching, thereby determining clusters of similar sounding sound recordings. In continuing this example, each cluster of similar sounding sound recordings can represent a single composition that contains one or more sound recordings whose music is based on the same composition.

It should be noted that, in some embodiments, upon obtaining a cluster of similar sounding sound recordings, the mechanisms can review ownership metadata or claim metadata associated with each of the sound recordings contained in the cluster of similar sounding sound recordings and determine a mapping of ownership statements to at least a portion of the cluster of similar sounding sound recordings. For example, one or more of the sound recordings in the cluster of similar sounding sound recordings can be associated with composition ownership information indicating at least one entity having ownership rights to the composition embodied in the reference sound recording from which the reference melody fingerprint was made. In continuing this example, the mechanisms can determine which composition ownership information extracted from the multiple sound recordings in the cluster of similar sounding sound recordings to associate with the cluster.

It should also be noted that, in some embodiments, upon associating a set of composition ownership information with a cluster of similar sounding sound recordings, the mechanisms can transmit a suitable recommendation to a user associated with the content item having the embedded sound recording. For example, in some embodiments, the mechanisms can determine that, unlike other sound recordings in the cluster of similar sounding sound recordings, an embedded sound recording from the cluster of similar sounding sound recordings does not include claim metadata that indicates composition rights from a publisher that represents songwriters. In response, the mechanisms can transmit a recommendation to the user to modify the claim metadata to include the composition rights of the publisher (e.g., by presenting a user interface including the modifications to the claim metadata of the associated content item). Additionally or alternatively, the mechanisms can transmit a recommendation to the publisher to claim the sound recording and/or other sound recordings in the cluster of similar sounding sound recordings that do not currently identify the ownership rights of the publisher. In another example, in some embodiments, the mechanisms can determine that claim metadata including composition rights to an entity are inconsistent with the claim metadata associated with other sound recordings in the cluster of similar sounding sound recordings that do not currently identify the ownership rights of the publisher. In response, the mechanisms can transmit a recommendation to the user to modify the claim metadata to remove the composition rights of the publisher.

In some embodiments, the mechanisms can determine whether a melody fingerprint matches a composition cluster of similar sounding sound recordings matching the input melody fingerprints. In response to determining that the melody fingerprint of a sound recording embedded in the uploaded content item belongs to a composition cluster of similar sounding sound recordings, the mechanisms can automatically populate composition ownership information for association with the sound recording embedded in the uploaded content item. For example, in response to uploading a content item to a media hosting service, the mechanisms can present a user interface that includes suggested composition ownership information. In another example, the mechanisms can provide composition ownership information to the media hosting service that allows the media hosting service to manage the ownership rights. For example, the ownership policy may indicate that the media hosting service should block access to the content item containing the sound recording. Alternatively, the ownership policy may indicate that the media hosting service should monetize the content item containing the sound recording. Under this option, the media hosting service can place advertisements together with the monetized content item and share the revenues generated from the advertisements with the content owners. In other instances, the ownership policy may indicate that the hosting service should statistically track usage of the content item containing the sound recording.

In some embodiments, the mechanisms can determine that an uploaded content item includes associated ownership information or composition rights information that is not associated with the composition cluster of similar sounding sound recordings. In response, the mechanisms can determine whether to update the composition cluster with the associated ownership information and/or the model parameters for generating the composition clusters.

It should be noted that, in some embodiments, to generate a reference database of composition clusters of similar sounding sound recordings, the mechanisms can receive a reference sound recording embodying a composition and composition ownership metadata indicating one or more entities having ownership rights to the composition. The mechanisms can generate a melody fingerprint from the reference sound recording. The mechanisms can then store the melody fingerprint and the associated composition ownership metadata in the reference database.

In continuing this example, the mechanisms can include a deep learning model that creates clusters of similar sounding sound recordings and maps different ownership claims to corresponding sound recordings of the cluster as the sound recordings in each cluster possess any combination of ownership per territory (e.g., none to a portion to 100% ownership of the composition in the United States). In a more particular example, shared tower model that is invariant to pitch shift by polling each of the twelve pitch shifts can be created. In another more particular example, the model is a convolutional neural network that operates on the non-folded chromagram of a large window of audio. It should be noted that convolutional filters having a large receptive field can be used to capture a melody or a composition having long chords. It should also be noted that, to handle low-complexity music, the model can be trained so that music deemed to have low complexity can have lower norms.

These mechanisms can be used in any suitable application. For example, these mechanisms can be applied to a content recognition system to automatically identify sound recordings and compositions embedded in user-provided content (e.g., video and/or audio files) uploaded to a media hosting service. In a more particular example, in order to allow the playback of a content item including a musical work, the media hosting service may be required to obtain master rights or rights to the sound recording from a music label that represents one or more music artists and composition rights or rights to the underlying melody of the song from a publisher that represents one or more songwriters. By automatically identifying both sound recordings and compositions, the content recognition system can be capable of detecting the use of both master recordings of a composition (e.g., a studio recording) released by a record label, and any other recordings of a composition, such as cover performances, newly released versions, alternative versions (e.g., acoustic versions) or live performance footage. Once media content is identified, a media hosting service can manage and monetize ownership rights on behalf of the content owners. Thus, for example, the media hosting service can automatically detect and block media content on behalf of the owners, or monetize the media content by placing targeted advertisements together with the media content and distributing royalties to the content owners.

Automated detection of media content can be beneficial for large scale media rights hosting and management solutions as manual review of all uploaded media content is, at best, impractical. Furthermore, it is difficult or impossible for humans to remember the ownership rights associated with all possible compositions or sound recordings that may be uploaded to a media hosting service. By automating the detection of sound recordings and compositions in an efficient and scalable manner, the media hosting service can minimize the amount of manual intervention required by rights holders. This automated detection is particularly beneficial for high traffic media hosting services which may receive thousands or millions of new user-provided media uploads every day. This results in increased efficiency in the overall usage of copyrighted works and the payment of royalties for the same, thereby benefiting the copyright holders of such recordings and compositions.

These and other features for rights management of embedded sound recordings using composition clustering are further described in connection with FIGS. 1-5.

Turning to FIG. 1, an illustrative example of a user interface for presenting information related to sound recordings embedded in a video content item is shown in accordance with some embodiments of the disclosed subject matter. In some embodiments, user interface 100 can be presented on a user device that is presenting a video content item, such as a mobile phone, a tablet computer, a desktop computer, a laptop computer, a smart television, and/or any other suitable type of user device. As illustrated, user interface 100 can include a video content item 102, and a panel of sound recording information 104.

In some embodiments, video content item 102 can be any suitable type of video content item, such as a compilation of music videos, a video that includes a soundtrack, a television show that includes a soundtrack, a movie that includes a soundtrack, and/or any other suitable type of video content. In some embodiments, video content item 102 can be a video content item that was requested on a user device presenting user interface 100, for example, from a page associated with a video sharing service listing and/or suggesting available videos.

In some embodiments, panel 104 can include any suitable information. For example, as shown in FIG. 1, panel 104 can include information about songs included in video content item 102. As a more particular example, as shown in FIG. 1, panel 104 can include song information 106, which can indicate a name of a song, an artist associated with the song (e.g., a name of a songwriter, a name of a singer, a name of a music group, and/or any other suitable artist), a publisher of the song, an album associated with the song, and/or any other suitable information. In some embodiments, any suitable information indicated in song information 106 can be hyperlinked. For example, in some embodiments, a name of a song can include a link to any suitable content, such as a music video associated with the song, an information page associated with the song (e.g., indicating popularity trends of the song, and/or any other suitable information), and/or any other suitable information. As another example, in some embodiments, an artist and/or a writer name can include a link to a page associated with the artist and/or the writer (e.g., a page that indicates other musical work associated with the artist and/or the writer, and/or any other suitable page). Note that, although two songs are indicated in panel 104 of FIG. 1, in some embodiments, any suitable number (e.g., one, five, ten, and/or any other suitable number) can be included.

In some embodiments, as described hereinbelow, a portion of the verified artist identification information (e.g., included in a majority of like media items representing the same sound recording) can be presented with hyperlinks associated with the verified artist identification information or any other suitable interface elements. For example, in response to verifying the identity of a publisher corresponding to a sound recording by comparing the sound recording with a reference database of composition clusters of similar sounding sound recordings, panel 104 can include a link corresponding to the publisher that, when selected, directs the user device to a page that includes supplemental information relating to the publisher, such as publisher bibliographic information, other sound recordings associated with the publisher, etc. Additionally, in some embodiments, unverified artist identification information can be presented, for example, without hyperlinks. For example, in response to being unable to verify the identity of a publisher corresponding to a sound recording, panel 104 can continue to present the identity of a publisher having the highest probability of being the publisher based on the information extracted from like media items and can inhibit the presentation of a link corresponding to the publisher.

In some embodiments, panel 104 can be presented in an interface separate from user interface 100 in which video content item 102 is being presented. For example, a portion of the information about songs included in video content item 102 can be presented in panel 104 and, in response to selecting a "Show More" interface element positioned within panel 104, additional information about songs included in video content item 102 can be presented in a subsequent user interface. In another example, general information relating to video content item 102 can be presented in panel 104 and, in response to selecting a "Show More" interface element positioned within panel 104, information about songs included in video content item 102 including a song title, a music artist, an album title, and licensing information associated with each song can be presented in a subsequent user interface. In continuing this example, the subsequent user interface can provide the user with an opportunity to access additional information relating to a particular song—e.g., other songs associated with a particular music artist, other songs included in an album having the presented album title, other media content associated with a presented collection society.

In some embodiments, user interface 100 can include any other suitable information or content. For example, in some embodiments, user interface 100 can include information related to a video sharing service that is providing video content item 102 and/or information included in panel 104. As a more particular example, in some embodiments, user interface 100 can include information about purchasing additional services associated with the video sharing service, such as an ability to view video content without advertisements, and/or any other suitable services. As another example, in some embodiments, user interface 100 can include links that allow a user of user interface 100 to include songs included in panel 104 in a playlist of content the user has generated using the video sharing service.

Although FIG. 1 shows a user interface 100 that can present ownership information related to sound recordings in a content item, this is merely illustrative. Such a graphical interface may be presented, for example, to an administrator of a content recognition system, a media hosting service, and/or a content owner. Alternatively, some or all of the metadata described herein may be used only internally, and may therefore not be available for display in a graphical interface.

It should be noted that the ownership metadata presented in these user interfaces can be divided into a number of categories, each comprising different identifying fields. For example, in some embodiments, the ownership metadata can be categorized into metadata, ownership information, rights, related assets, and reference content categories. The metadata category provides various fields identifying the composition including, for example, an identifier field (e.g., CMS asset ID), type (e.g., composition or sound recording), provider (e.g., the entity that submitted the reference data), source information, a date or time of submission, ISWC information, title information, category information, writer information, genre information, label information, audio ISRC information, etc. It should be noted that some of the fields may be empty indicating that the information is presently still unknown, incomplete, and/or unverified.

The ownership information category can identify the entities having ownership rights to the composition, the countries where the ownership applies (as ownership may be different between different countries), and a percent or fraction of ownership if applicable (because in some countries, ownership may be split between more than one entity). For example, the ownership information can indicate that "Publisher A" owns 66.66% of the composition in the United States and "Publisher B" owns 33.34% of the composition in the United States.

The rights category can indicate the ownership policies selected by the content owners (an owner policy, if known, and the policy actually being applied by the media hosting service (an applied policy). As explained above, such policies can include, for example, monetize, track, or block.

The related assets category can identify other assets (e.g., sound recordings) that embed the composition. For example, the related assets category can identify each sound recording in a cluster of similar sounding sound recordings that embodies the composition.

The reference content category can identify reference recordings, if any, provided by the content owners of the composition.

Additionally to the user interfaces described above, in some embodiments, a user interface can be presented to a user that is uploading a content item to the media hosting service. For example, in response to determining that the melody fingerprint of a sound recording embedded in the uploaded content item belongs to a composition cluster of similar sounding sound recordings, a user interface for the content item can be presented in which composition ownership information corresponding to the composition ownership information associated with the cluster of similar sounding sound recordings can be automatically populated. In another example, in response to determining that the melody fingerprint of a sound recording embedded in the uploaded content item belongs to a composition cluster of similar sounding sound recordings, a user interface for the content item can be presented in which composition ownership information that corresponds to the composition ownership information associated with the cluster of similar sounding sound recordings can be suggested to the user for association with the content item.

Turning to FIG. 2, an illustrative example 200 of hardware for rights management of embedded sound recordings using composition clustering that can be used in accordance with some embodiments of the disclosed subject matter is shown. As illustrated, hardware 200 can include a content server 202, a communication network 204, and/or one or more user devices 206, such as user devices 208 and 210.

Content server 202 can be any suitable server(s) for storing and/or providing media content to user devices 206. For example, in some embodiments, content server 202 can store media content, such as videos, television programs, movies, live-streamed media content, audio content, animations, video game content, graphics, and/or any other suitable media content. In some embodiments, content server 202 can transmit media content to user devices 206, for example, via communication network 204. In some embodiments, content server 202 can determine information related to a sound recording (e.g., a song in a soundtrack, and/or any other suitable sound recording) embedded in video content items stored on content server 202, as shown in and described below in connection with FIG. 4.

For example, content server 202 can be configured to enable users to upload, share, and view media content, such as video and audio files. In one embodiment, users can interact with the content server 202 via a media hosting web site accessible by a web browser executing on a user device 206. Using the user device 206, users can upload user-provided media to the content server 202 and/or view user-requested media hosted by content server 202 (e.g., via an online interface facilitated over a network). The content server 202 can include a content recognition system to identify ownership rights and policies pertaining to the media content hosted by the content server 202. For example, the content recognition system can receive an audio clip from the content server 202 can return the corresponding ownership information or suggested ownership information. In a more particular example, the content recognition system can determine whether a melody fingerprint or any other suitable compact representation of the audio clip matches a composition cluster of similar sounding sound recordings in a reference database and can return the corresponding ownership information of the cluster when the audio clip is determined to melody match the composition cluster (e.g., when a machine learning algorithm is applied to generate clusters of similar sounding sound recordings, the audio clip would be placed in one of the clusters).

As mentioned above, it should be noted that the content recognition system can include a reference database of reference melody fingerprints for reference sound recordings provided by content owners. Melody fingerprints are designed to uniquely represent a composition (which may be embodied in various studio recordings, live performance recordings, or cover performances) based on the melody of the composition. A melody fingerprint can compactly represent the melodic characteristics of a reference sound recording in a format that can be efficiently compared and matched to other melody fingerprints. In contrast to an audio fingerprint, which uniquely represents a particular recording of a performance, a melody fingerprint instead represents the melody of a composition that is embodied in the performance, and does so in such a way that variations in key, instrumentation, encoding formats, and other performing, recording, and processing variations do not substantially affect the features of the melody fingerprint. Thus, a melody fingerprint for a live performance of a particular composition matches a melody fingerprint for a studio recording of that composition, while the audio fingerprints for the live and studio performances will not match.

In continuing this example, content server 202 can include a deep learning model that creates clusters of similar sounding sound recordings and maps different ownership claims to corresponding sound recordings of the cluster as the sound recordings in each cluster possess any combination of ownership per territory (e.g., none to a portion to 100% ownership of the composition in the United States). In a more particular example, shared tower model that is invariant to pitch shift by polling each of the twelve pitch shifts can be created. In another more particular example, the model is a convolutional neural network that operates on the non-folded chromagram of a large window of audio. It should be noted that convolutional filters having a large receptive field can be used to capture a melody or a composition having long chords. It should also be noted that, to handle low-complexity music, the model can be trained so that music deemed to have low complexity can have lower norms.

In some embodiments, content server 202 can determine whether a melody fingerprint of the sound recorded embedded in an uploaded content item matches a melody fingerprint associated with a cluster of similar sounding sound recordings. Each cluster of similar sounding sound recordings in the reference database can represent a single composition that contains one or more sound recordings whose music is based on the same composition. Based on the outcomes of the matches, different actions can be taken.

For example, in some embodiments, content server 202 can output ownership information indicating the identified entities having ownership rights associated with the cluster to the audio clip based on the foregoing outcomes. This process is further described below in connection with FIG. 4.

In one embodiment, content server 202 can provide the audio clips to the content recognition system as part of the upload flow of the content server 202. Thus, in this embodiment, user-provided media content can be identified prior to, concurrently with, or shortly after being stored to the content database and made accessible for download or viewing by other users, if permitted per the ownership metadata found in an ownership rights database. In another embodiment, the content recognition system can be configured to perform legacy scanning of previously stored content in the content database. This embodiment allows, for example, the content recognition system to identify ownership rights pertaining to hosted content that existed prior to the first use of the content recognition system (e.g., before content server 202 gained access to the content recognition system). Additionally, legacy scanning is useful for updating ownership information and usage policies associated with a content database as new reference sound recordings and the ever changing ownership metadata become available to the content recognition system.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links (e.g., communications links 212) to communication network 204 that can be linked via one or more communications links (e.g., communications links 214) to content server 202. The communications links can be any communications links suitable for communicating data among user devices 206 and content server 202 such as network links, dial-up links, wireless links, hard-wired links, any other suitable communications links, or any suitable combination of such links.

User devices 206 can include any one or more user devices suitable for requesting video content, presenting a user interface that presents information related to sound recordings embedded in the video content, and/or for performing any other suitable functions. For example, in some embodiments, user devices 206 can include a mobile device, such as a mobile phone, a tablet computer, a wearable computer, a laptop computer, a virtual reality headset, a vehicle (e.g., a car, a boat, an airplane, or any other suitable vehicle) information or entertainment system, and/or any other suitable mobile device and/or any suitable non-mobile device (e.g., a desktop computer, a game console, and/or any other suitable non-mobile device). As another example, in some embodiments, user devices 206 can include a media playback device, such as a television, a projector device, a game console, desktop computer, and/or any other suitable non-mobile device.

Although content server 202 is illustrated as one device, the functions performed by content server 202 can be performed using any suitable number of devices in some embodiments. For example, in some embodiments, multiple devices can be used to implement the functions performed by content server 202.

Although two user devices 208 and 210 are shown in FIG. 2 to avoid over-complicating the figure, any suitable number of user devices, and/or any suitable types of user devices, can be used in some embodiments.

Content server 202 and user devices 206 can be implemented using any suitable hardware in some embodiments. For example, in some embodiments, devices 202 and 206 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as content server 202). For example, in some embodiments, the server program can cause hardware processor 302 to transmit a video content item to user device 206, transmit instructions for presenting information related to a sound recording embedded in the video content item, and/or performing any other suitable actions. In some embodiments, hardware processor 302 can be controlled by a computer program stored in memory and/or storage 304 of user device 206. For example, the computer program can cause hardware processor 302 to present a user interface for presenting a video content item and information related to sound recordings embedded in the video content item, and/or perform any other suitable actions.

Memory and/or storage 304 can be any suitable memory and/or storage for storing programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
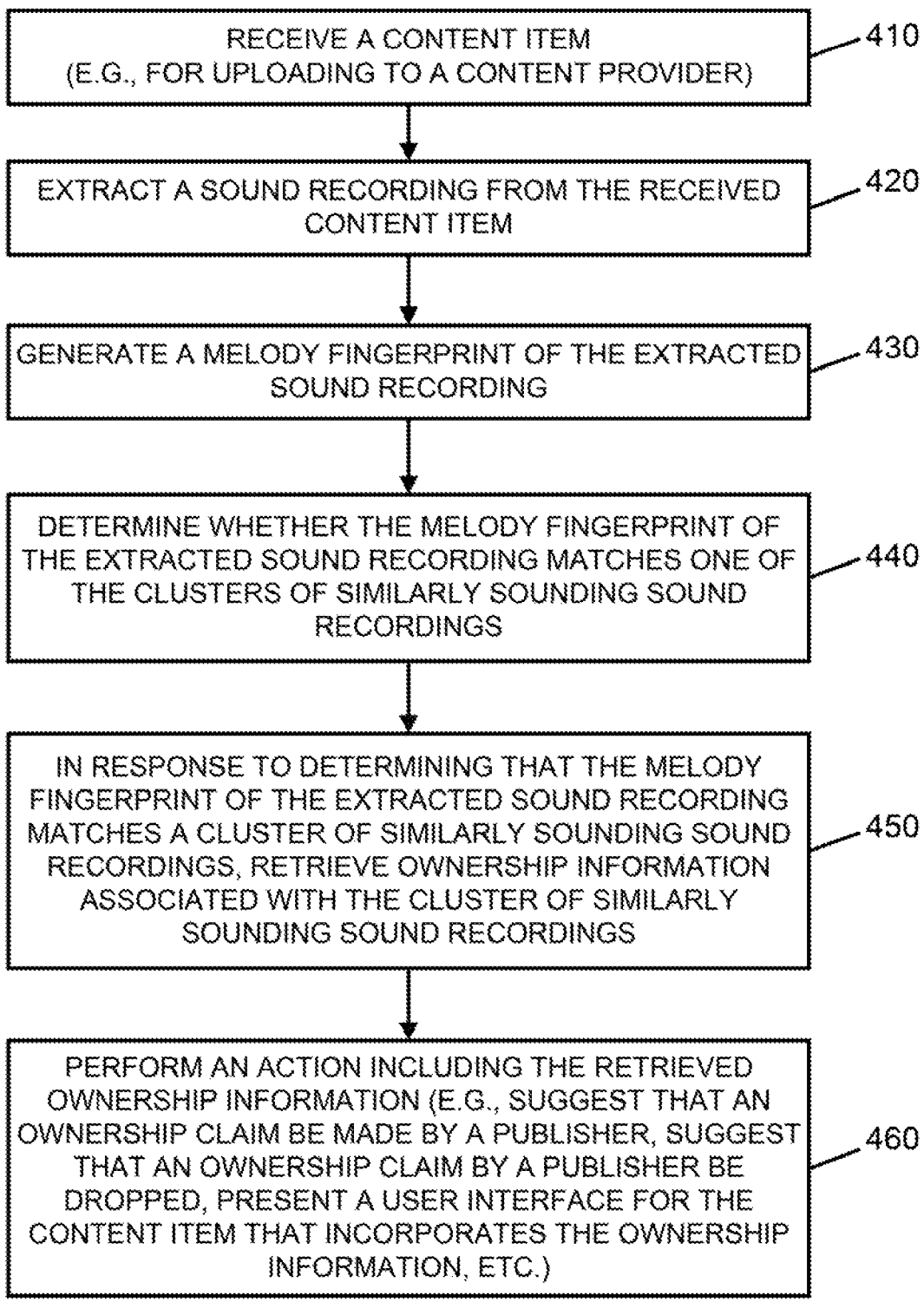
FIG. 4 shows an illustrative example of a process for rights management of embedded sound recordings using composition clustering in accordance with some embodiments of the disclosed subject matter.

Turning to FIG. 4, an illustrative example 400 of a process for rights management of embedded sound recordings using composition clustering is shown in accordance with some embodiments of the disclosed subject matter. In some embodiments, blocks of process 400 can be executed by any suitable device, such as content server 202 and/or user device 206, as shown in and described above in connection with FIG. 2.

Process 400 can begin at 410 by receiving a content item. In some embodiments, the content item can be a video content item with one or more embedded sound recordings. For example, in some embodiments, the content item can be a compilation of music videos, a video with a soundtrack, a movie with a soundtrack, a television show with a soundtrack, and/or any other suitable type of video content item.

As described above, process 400 can receive a content item that includes one or more embedded sound recordings by a user that is uploading the content item to a media hosting service. In another example, process 400 can receive a content by performing legacy scanning of previously stored content in a content database of a content recognition system.

In some embodiments, at 420, process 400 can extract a sound recording or any other suitable audio portion from the content item. It should be noted that multiple sound recordings can be embedded within a received content item.

In some embodiments, at 430, process 400 can generate a melody fingerprint or other compact representation of the extracted sound recording. For example, the generated melody fingerprint can represent the underlying melody in the sound recording from the received content item.

It should be noted that melody fingerprints are designed to uniquely represent a composition (which may be embodied in various studio recordings, live performance recordings, or cover performances) based on the melody of the composition. A melody fingerprint can compactly represent the melodic characteristics of a sound recording in a format that can be efficiently compared and matched to other reference melody fingerprints. In contrast to an audio fingerprint, which uniquely represents a particular recording of a performance, a melody fingerprint instead represents the melody of a composition that is embodied in the performance, and does so in such a way that variations in key, instrumentation, encoding formats, and other performing, recording, and processing variations do not substantially affect the features of the melody fingerprint. Thus, a melody fingerprint for a live performance of a particular composition matches a melody fingerprint for a studio recording of that composition, while the audio fingerprints for the live and studio performances will not match.

Figure 5:
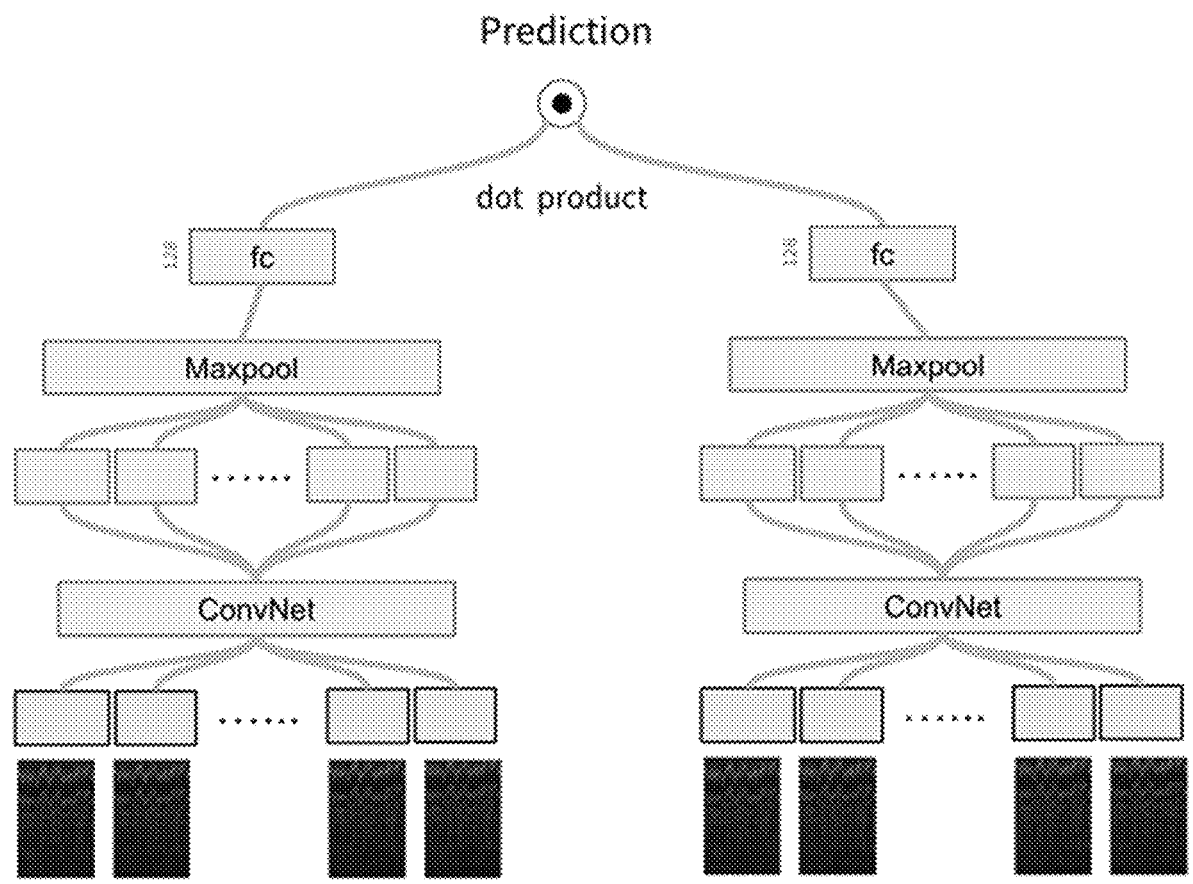
FIG. 5 shows an illustrative example of a convolutional neural network that can be used to generate composition clusters of similar sounding sound recordings in accordance with some embodiments of the disclosed subject matter.

In some embodiments, at 440, process 400 can determine whether the generated melody fingerprint of the extracted sound recording matches a cluster of similar sounding sound recordings stored in a reference database. For example, process 400 can compare the melody fingerprint against a reference database of similar sounding sound recordings by performing a similarity comparison of melody fingerprints or other suitable compact representations of sound recordings. In a more particular example, as described above, process 400 can use a machine learning algorithm that creates clusters of similar sounding sound recordings. An illustrative example of a machine learning algorithm that can be used to create one or more clusters of similar sounding sound recordings is shown in FIG. 5. As shown, a shared tower model that is invariant to pitch shift by polling each of the twelve pitch shifts can be created. In another more particular example, the model is a convolutional neural network that operates on the non-folded chromagram of a large window of audio. It should be noted that convolutional filters having a large receptive field can be used to capture a melody or a composition having long chords. It should also be noted that, to handle low-complexity music, the model can be trained so that music deemed to have low complexity can have lower norms.

In continuing this example, the machine learning algorithm can determine whether the melody fingerprint of the extracted sound recording matches one of the clusters of similar sounding sound recordings stored in a reference database.

In some embodiments, in response to determining that the melody fingerprint of the extracted sound recording matches a cluster of similar sounding sound recordings, process 400 can retrieve ownership information associated with the cluster at 440. For example, a cluster of similar sounding sound recordings can be associated with common ownership information extracted from the sound recordings belonging to the cluster. In a more particular example, process 400 can determine that a consensus has been attained in response to determining that a particular percentage of ownership metadata indicates particular composition rights associated with a composition. It should be noted that any suitable approach for determining that a consensus has been attained can be used (e.g., a similarity measurement of the ownership metadata extracted from different uploaded instances of a composition).

In some embodiments, in reviewing the ownership metadata associated with the sound recordings belonging to the cluster, process 400 can additionally determine a confidence level associated with a particular piece of ownership metadata associated with the composition based on any suitable information, such as the number of sound recordings that identify the ownership metadata and/or any other suitable information.

In some embodiments, at 460, process 400 can perform an action using the retrieved ownership information.

In an embodiment for composition clearance, process 400 can determine a cluster that contains multiple sound recordings and that the uploaded content item belongs to the cluster. In response, process 400 can present a user interface to a user that uploaded the content item that includes suggested composition ownership information based on the ownership metadata of the cluster. In a more particular example, process 400 can identify the composition contained in the uploaded content item and can indicate to the user that uploaded the content item accept the composition ownership information in order for the content item to be made available to other users of the media hosting service. In another more particular example, process 400 can transmit a notification to a publisher entity or any other suitable entity regarding a claim to the sound recording in the uploaded content item. In yet another more particular example, in response to determining that there are other sound recordings in the cluster that do not identify the publisher entity as the owner of the composition rights, process 400 can transmit a suitable notification to the publisher entity regarding the additional sound recordings for making a claim.

In some embodiments, process 400 can provide composition ownership information to the media hosting service that allows the media hosting service to manage the ownership rights. For example, the ownership policy may indicate that the media hosting service should block access to the content item containing the sound recording. Alternatively, the ownership policy may indicate that the media hosting service should monetize the content item containing the sound recording. Under this option, the media hosting service can place advertisements together with the monetized content item and share the revenues generated from the advertisements with the content owners. In other instances, the ownership policy may indicate that the hosting service should statistically track usage of the content item containing the sound recording.

In some embodiments, process 400 can determine a cluster that contains multiple sound recordings and that at least one of the sound recording is part of the public domain. As such, an indicator that labels the sound recording as public domain can be applied to the remaining sound recordings in the cluster.

In some embodiments, process 400 can determine that an uploaded content item includes associated ownership information or composition rights information that is not associated with the composition cluster of similar sounding sound recordings. In response, the mechanisms can determine whether to update the composition cluster with the associated ownership information and/or the model parameters for generating the composition clusters. In another example, in response to determining that the ownership information is not correct as the ownership information of the content item does not match the ownership information of the sound recordings in the cluster, process 400 can transmit a notification to the publisher entity indicating that the publisher entity is overclaiming ownership rights and should drop this ownership claim.

In some embodiments, additionally or alternatively to presenting the determined composition and artist information, process 400 can overwrite or other replace ownership metadata associated with versions of the composition that is inconsistent with the determined ownership information.

In some embodiments, at least some of the above described blocks of the process of FIG. 4 can be executed or performed in any order or sequence not limited to the order and sequence shown in and described in connection with the figure. Also, some of the above blocks of FIG. 4 can be executed or performed substantially simultaneously where appropriate or in parallel to reduce latency and processing times. Additionally or alternatively, some of the above described blocks of the process of FIG. 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for rights management of embedded sound recordings using composition clustering are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for providing information related to embedded sound recordings using composition clustering, the method comprising:
   receiving, by a server and from a user device of a user, a content item;
   extracting, by the server, a sound recording from the content item;
   generating, by the server, a melody fingerprint of the extracted sound recording, wherein the melody fingerprint represents a melody of a composition embodied in the sound recording extracted from the content item;
   determining, by the server, whether the melody fingerprint of the extracted sound recording matches one of a plurality of composition clusters of similar sounding sound recordings of the composition in a reference database, wherein each composition cluster in the plurality of composition clusters of the similar sounding sound recordings corresponds to a single composition and is associated with ownership information based on a plurality of ownership information associated with each of the similar sounding sound recordings in the composition cluster;
   in response to determining that the melody fingerprint of the extracted sound recording matches a particular composition cluster of the plurality of composition clusters of the similar sounding sound recordings, retrieving, by the server, an ownership information associated with the particular composition cluster;
   mapping, by the server, the ownership information associated with the particular composition cluster to the sound recording extracted from the content item;
   determining, by the server and based on the mapping, whether the sound recording extracted from the content item is associated with a particular-ownership rights indicated by at least a portion of the ownership information, wherein the particular ownership rights are associated with a particular entity; and
   in response to determining that the sound recording extracted from the content item is not associated with the particular ownership rights:
      causing, by the server, a display device associated with the user device to present a user interface that prompts the user to associate the particular ownership rights with the content item; and
      transmitting, by the server, a recommendation to the particular entity to claim the particular ownership rights with respect to the sound recording extracted from the content item.

2. The method of claim 1, further comprising:
   determining, by the server, a user-inputted entity in ownership information associated with the content item does not match the ownership information associated with the particular-composition cluster; and
   transmitting, by the server, a notification to the user-inputted entity that an ownership claim to the content item should not be made.

3. The method of claim 1, further comprising:
   determining, by the server, that additional sound recordings in the particular composition cluster of the similar sounding sound recordings are not associated with an entity corresponding to the ownership information; and
   transmitting, by the server, a recommendation to the entity associated with the ownership information regarding an ownership claim to the additional sound recordings.

4. The method of claim 1, further comprising determining whether ownership information associated with each of the sound recordings in the particular composition cluster should be associated with the particular composition cluster.

5. A system for providing information related to embedded sound recordings using composition clustering, the system comprising:
   a memory; and
   a hardware processor that, when executing computer-executable instructions stored in the memory, is configured to:
      receive, from a user device of a user, a content item;
      extract a sound recording from the content item;
      generate a melody fingerprint of the extracted sound recording, wherein the melody fingerprint represents a melody of a composition embodied in the sound recording extracted from the content item;
      determine whether the melody fingerprint of the extracted sound recording matches one of a plurality of composition clusters of similar sounding sound recordings of the composition in a reference database, wherein each composition cluster in the plurality of composition clusters of the similar sounding sound recordings corresponds to a single composition and is associated with ownership information based on a plurality of ownership information associated with each of the similar sounding sound recordings in the composition cluster;
      in response to determining that the melody fingerprint of the extracted sound recording matches a particular composition cluster of the plurality of composition clusters of the similar sounding sound recordings, retrieve an ownership information associated with the particular composition cluster;
      map the ownership information associated with the particular composition cluster to the sound recording extracted from the content item;
      determine, based on the mapping, whether the sound recording extracted from the content item is associated with a particular ownership rights indicated by at least a portion of the ownership information, wherein the particular ownership rights are associated with a particular entity; and
      in response to determining that the sound recording extracted from the content item is not associated with the particular ownership rights:
         cause a display device associated with the user device to present a user interface that prompts the user to associate the particular ownership rights with the content item; and
         transmit a recommendation to the particular entity to claim the particular ownership rights with respect to the sound recording extracted from the content item.

6. The system of claim 5, wherein the hardware processor is further configured to:
- determine a user-inputted entity in ownership information associated with the content item does not match the ownership information associated with the particular composition cluster; and
- transmit a notification to the user-inputted entity that an ownership claim to the content item should not be made.

7. The system of claim 5, wherein the hardware processor is further configured to:
- determine that additional sound recordings in the particular composition cluster of the similar sounding sound recordings are not associated with an entity corresponding to the ownership information; and
- transmit a recommendation to the entity associated with the ownership information regarding an ownership claim to the additional sound recordings.

8. The system of claim 5, wherein the hardware processor is further configured to determine whether ownership information associated with each of the sound recordings in the particular composition cluster should be associated with the particular composition cluster.

9. A non-transitory computer-readable medium for providing information related to embedded sound recordings using composition clustering, wherein the non-transitory computer-readable medium contains computer-executable instructions that, when executed by a processor, cause the processor to:
- receive, from a user device of a user, a content item;
- extract a sound recording from the content item;
- generate a melody fingerprint of the extracted sound recording, wherein the melody fingerprint represents a melody of a composition embodied in the sound recording extracted from the content item;
- determine whether the melody fingerprint of the extracted sound recording matches one of a plurality of composition clusters of similar sounding sound recordings of the composition in a reference database, wherein each composition cluster in the plurality of composition clusters of the similar sounding sound recordings corresponds to a single composition and is associated with ownership information based on a plurality of ownership information associated with each of the similar sounding sound recordings in the composition cluster;
- in response to determining that the melody fingerprint of the extracted sound recording matches a particular composition cluster of the plurality of composition clusters of the similar sounding sound recordings, retrieve an ownership information associated with the particular composition cluster;
- map the ownership information associated with the particular composition cluster to the sound recording extracted from the content item;
- determine, based on the mapping, whether the sound recording extracted from the content item is associated with a particular ownership rights indicated by at least a portion of the ownership information, wherein the particular ownership rights are associated with a particular entity; and
- in response to determining that the sound recording extracted from the content item is not associated with the particular ownership rights:
  - cause a display device associated with the user device to present a user interface that prompts the user to associate the particular ownership rights with the content item; and
  - transmit a recommendation to the particular entity to claim the particular ownership rights with respect to the sound recording extracted from the content item.

10. The non-transitory computer-readable medium of claim 9, wherein the computer-executable instructions that, when executed by the processor, further cause the processor to:
- determine a user-inputted entity in ownership information associated with the content item does not match the ownership information associated with the particular composition cluster; and
- transmit a notification to the user-inputted entity that an ownership claim to the content item should not be made.

11. The non-transitory computer-readable medium of claim 9, wherein the computer-executable instructions that, when executed by the processor, further cause the processor to:
- determine that additional sound recordings in the particular composition cluster of the similar sounding sound recordings are not associated with an entity corresponding to the ownership information; and
- transmit a recommendation to the entity associated with the ownership information regarding an ownership claim to the additional sound recordings.

12. The non-transitory computer-readable medium of claim 9, wherein the computer-executable instructions that, when executed by the processor, further cause the processor to:
- determine whether ownership information associated with each of the sound recordings in the particular composition cluster should be associated with the particular composition cluster.

* * * * *